United States Patent
Hopson

[11] Patent Number: 5,951,728
[45] Date of Patent: Sep. 14, 1999

[54] COUPLING WITH FILTERS

[75] Inventor: Douglas F. Hopson, Union City, Pa.

[73] Assignee: Snap-Tite, Inc., Union City, Pa.

[21] Appl. No.: 08/317,135

[22] Filed: Oct. 3, 1994

[51] Int. Cl.$^6$ .................................................. B01D 35/02
[52] U.S. Cl. .............................. 55/482; 55/502; 55/503; 55/525; 137/545; 210/446; 210/448; 210/451; 210/452
[58] Field of Search .............................. 55/482, 502, 503, 55/505, 511, 525; 137/545, 549, 550; 210/428, 429, 439, 446, 448, 451, 452

[56] References Cited

U.S. PATENT DOCUMENTS

| | | | |
|---|---|---|---|
| 331,531 | 12/1885 | Neracher | 137/545 |
| 979,481 | 12/1910 | Hannold | 210/448 |
| 984,082 | 2/1911 | Edgerton | 137/550 |
| 1,832,776 | 11/1931 | Hudson | 55/503 |
| 1,971,120 | 8/1934 | Rice et al. | 210/448 |
| 2,068,837 | 1/1937 | Aronson | 55/482 |
| 2,068,858 | 1/1937 | Jones | 210/448 |
| 2,247,590 | 7/1941 | Strong | 137/550 |
| 2,761,529 | 9/1956 | Wisenbaugh | 210/452 |
| 4,707,262 | 11/1987 | Murken | 210/448 |
| 5,323,812 | 6/1994 | Wilcox | 137/614.05 |

FOREIGN PATENT DOCUMENTS 586018  3/1947  United Kingdom ............... 137/545

*Primary Examiner*—C. Scott Bushey
*Attorney, Agent, or Firm*—Woodling, Krost & Rust

[57] ABSTRACT

A coupling is provided having filters in the coupler and/or the nipple members. The coupler filter resides in the inlet to the coupler and the nipple filter resides in the inlet to the nipple member. The coupler and the nipple filters are easily replace due to their locations and the means employment to secure them in place. The coupler and the nipple filters are strength stainless steel filters having pores in the range of to 250 microns.

17 Claims, 4 Drawing Sheets

COUPLING WITH FILTERS

Field of the Invention

This invention relates to couplings which include filters to remove contaminants. The preferred embodiment of the invention is for use in connection with gases. However, other embodiments could accommodate liquids.

BACKGROUND OF THE INVENTION

It has become necessary in certain areas of the United States to switch from gasoline powered vehicles to either propane or natural gas powered vehicles. For instance, some portions of southern California are so heavily plagued by smog that alternative fuels are being strongly pursued to reduce the air pollution.

U.S. Pat. No. 5,323,812 to Wilcox issued Jun. 28, 1994 is directed toward a pressure locked coupling for use with propane and natural gas. The coupling of the '812 patent securely couples the source of the gas to the vehicle. The present invention adds filters to the coupler and the nipple. The filters can be in both the coupler and the nipple, the coupler only or the nipple only.

OBJECTS OF THE PRESENT INVENTION

It is an object of the present invention to provide a coupling for use with gas delivery systems which removes contaminants from the gas stream. The present invention insures the delivery and transfer of clean gas.

It is a further object of the present invention to provide a coupling having filters in the coupler and the nipple, the coupler only or the nipple only.

It is a further object of the present invention to provide a coupling having filters which are easily removable and easily interchangeable. This is accomplished by positioning the filters at the inlets of the coupler and the nipple. In the coupler the filter is maintained in place by means of a first shoulder which resides on the first wall means of the coupler and a snap ring. In the nipple the filter is maintained in place by a second shoulder on the second wall means of the nipple body and an O-ring.

It is a further object of the present invention to provide a coupling having a high contaminant capacity filter therein.

It is a further object of the present invention to provide a coupler filter and a nipple filter oriented such that the direction of the flow of the gas in said coupler and said nipple urges said filters to engage respective shoulders on first and second wall means within the coupler and the nipple respectively.

It is a further object of the present invention to provide a coupler and a nipple each having a 40 to 250 micron high strength stainless steel filter located therein. The 40 to 250 micron filters have pore sizes in the range of 40 to 250 microns.

BRIEF DESCRIPTION OF THE DRAWINGS

The structure, operation and advantage of the preferred embodiment of the invention will become further apparent upon consideration of the following description taken in conjunction with the accompanying drawings, wherein:

FIG. 1 illustrates the coupler filter residing in the first end portion of the coupler. FIG. 1 also illustrates an arrangement of the pressure-locking structure of U.S. Pat. No. 5,323,812 to Wilcox issued Jun. 28, 1994. FIG. 1 shows the coupler filter secured by a first shoulder on the first wall means of the coupler and a snap ring.

FIG. 3 illustrates the coupler filter secured in place by a first shoulder on the first wall means of the coupler and a snap ring.

DETAILED DESCRIPTION OF THE INVENTION

Figure 1:
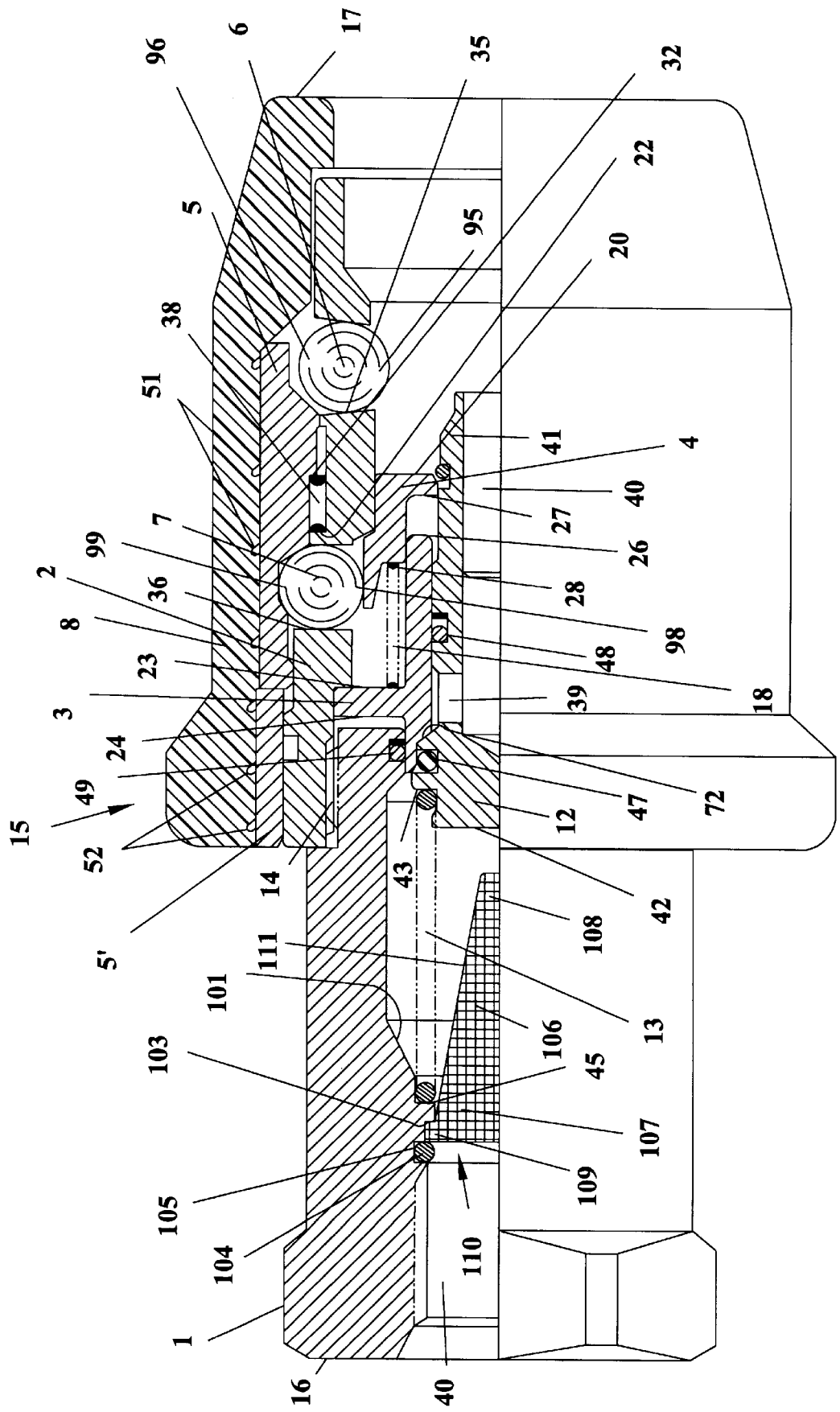
FIG. 1 is a half-sectional view of the coupler disengaged.

The coupling with filters includes a coupler 15 and a nipple 66. The coupler 15 and nipple 66 are sometimes referred to herein as coupler halfs. The coupler 15 is described first immediately below followed by the description of the nipple. The coupler includes an adaptor 1, a coupler valve 12, a retainer 3, a sliding sleeve 4, a body 2, a locking sleeve 5, a cylindrical block 5', a bumper 8, first locking balls 6, second locking balls 7, a first wall means 101, a first shoulder 103 located on the first wall means 101, a snap ring 104, a first recess 105, and a coupler filter 106. The coupler 15 has a first end portion 16 and a second end portion 17.

Body 2 has first 35 and second 36 ball housings located therein. First ball housings 35 are tapered conical bores. Second ball housings 36 are cylindrical bores. Additionally there are a plurality of first 6 and second 7 balls residing in the first 35 and second 36 housings of the body 2. First and second balls 6 and 7 are sometimes referred to hereinafter as first and second ball detents. See, FIG. 1. The first end portion 16 of the coupler is sometimes referred to herein as the first inlet. Body 2 includes a third spring shoulder 22.

First balls 6 or first ball detents 6 have a first portion 95 and a second portion 96. Second balls 7 or second ball detents 7 have a first portion 98 and a second portion 99. FIG. 1 illustrates the coupler disengaged. Balls 6 are restrained by the second ball housings 35 due to their tapered conical shape. Ball housings 35 prevent balls 6 from becoming free of the coupler. Sliding sleeve 4 restrains balls 7 during disengagement of the coupler and the nipple.

The sliding sleeve 4 is generally cylindrically shaped and has a face 20 which engages the nipple during coupling. The sliding sleeve includes a second spring shoulder 28. Retainer 3 has a first shoulder 23, a face 26 and a second shoulder 24. Coupler valve 12 has first 42 and second 41 end portions, respectively, ports 39, a valve seat 72, and a shoulder 43. Thread means 14 affix the body to the adaptor 1.

Locking sleeve 5 is generally cylindrically shaped. Locking sleeve 5 includes a fourth spring shoulder 32. The locking sleeve 5 is affixed to bumper 8 by means of circumferential ridges 51 residing on the exterior of said locking sleeve 5. Bumper 8 facilitates easy uncoupling of the coupler and the nipple. Circumferential block 5' supports locking sleeve 5 and bumper 8. Block 5' is also affixed to bumper 8 by means of circumferential ridges 52.

The adaptor 1 has a first spring shoulder 45 located thereon. A sliding sleeve spring 18 is disposed between the first shoulder 23 of the retainer and the second spring shoulder 28 of the sliding sleeve. A locking sleeve spring 38 is disposed between the third spring shoulder 22 of the body 2 and the fourth spring shoulder 32 of the locking sleeve 5. A coupler valve spring 13 is disposed between the first spring shoulder 45 of the adaptor and the shoulder 43 of the coupler valve 12.

FIG. 1 illustrates the coupler not engaged with the nipple 66. When the coupling is disengaged, coupler valve 12 seats against retainer 3 to prevent flow therethrough. Specifically, valve seat 72 mates with a corresponding surface on the retainer 3 and O-ring seal 47 seals port 39 to prohibit flow. Coupler valve spring 13 urges coupler valve 12 toward the second end portion 17 of the coupler to the closed position. The movement of the coupler valve 12 toward the second end portion of the coupler is limited by retainer 3.

The pressure source (not shown) is connected to adaptor 1. The pressure source resides upstream of the coupler. Passageway 40 is therefore under the source pressure, if any. FIG. 1 indicates the condition of the coupling with no or very little pressure applied to the coupler.

When uncoupled, sliding sleeve spring 18 urges the sliding sleeve toward the second end portion 17 of the coupler. The sliding sleeve engages and supports second balls 7. While uncoupled, first balls 6 have room to move freely in tapered ball housing 35 to the extent permitted by locking sleeve 5.

The first wall means 101 of the coupler defines a first fluid passage through the coupler. The first wall means includes a first shoulder 103 and a first recess 105. See FIG. 3. A coupler filter 106 resides within the first fluid passageway 40 as shown in FIG. 1. The coupler filter 106 includes a first lip 109. The first lip 109 of the coupler filter engages the first shoulder 103 of the first wall means 101. A snap ring 104 is employed to retain the coupler filter in position. The snap ring 104 resides in the first recess 105. The coupler filter of the preferred embodiment is made from high strength stainless steel.

The coupler filter of the preferred embodiment employs 17–4 ph (precipitating hardening) or 15–5 ph high strength stainless steel. The coupler filter is typically in the 40 to 250 micron range. The 40 to 250 micron filters have pore sizes in the range of 40 to 250 microns. This means that a 40 micron filter will allow particles smaller than 40 microns to pass therethrough but will not permit particles 40 microns or larger to pass therethrough. It will be noted from FIG. 1 that the coupler filter is larger than the nipple filter 120 which will be discussed hereinbelow. The coupler filter has a high contaminant capacity.

It will be observed by those skilled in the art that different size filters outside of the 40 to 250 micron range are usable in the coupling of the present invention. The 40 to 250 micron filters have pore sizes in the range of 40 to 250 microns.It will also be observed by those skilled in the art that the coupler filter could assume various dimensions and shapes and still function. The coupler filter of the preferred embodiment of the present invention is generally conically shaped. The coupler filter has an interior 110 and an exterior 111. The coupler filter of the preferred embodiment is oriented such that the flow direction (FIG. 1) is in the direction from first end portion 16 to the second end portion 17 of the coupler.

Figure 3:
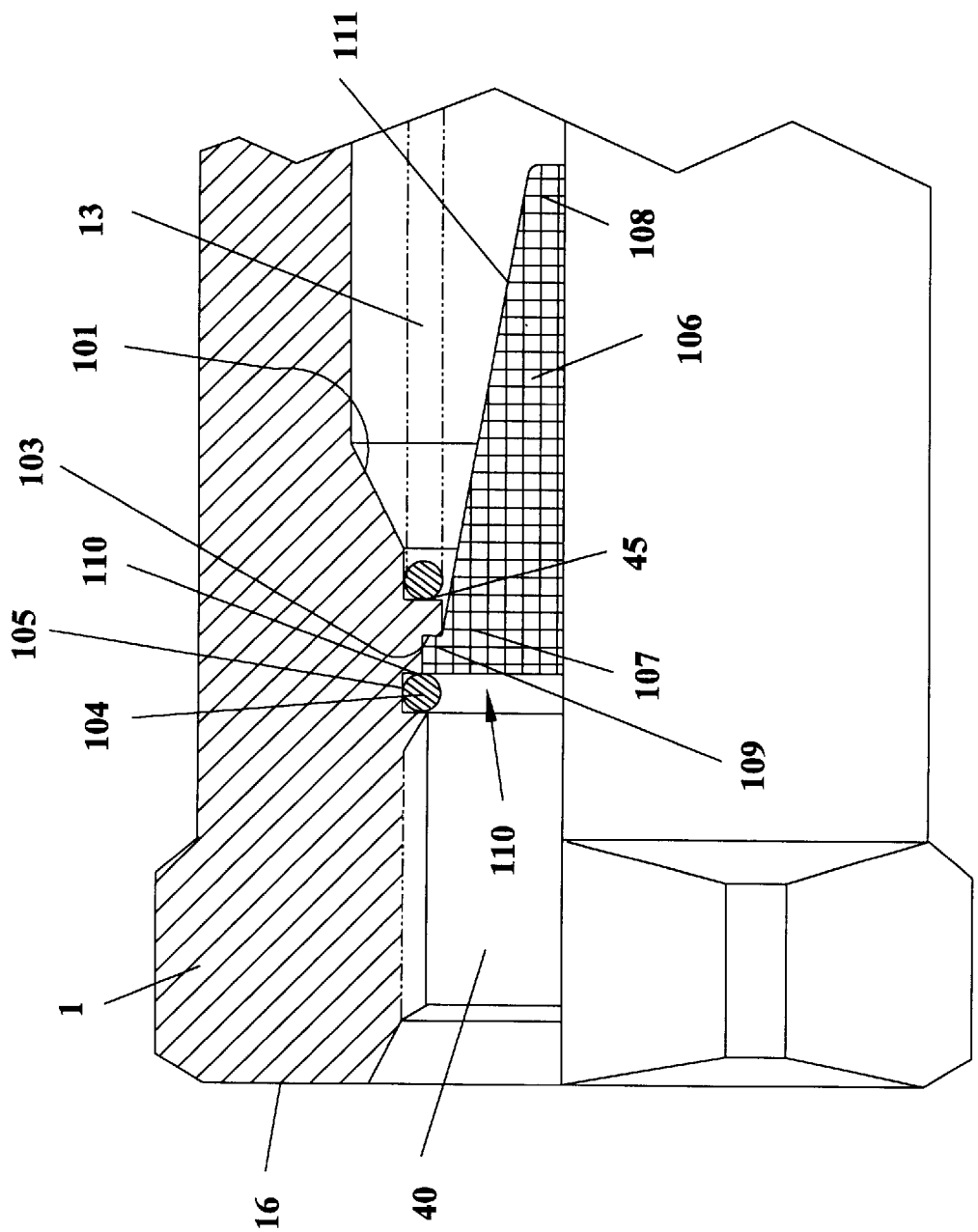
FIG. 3 is simply an enlarged half-sectional view of the portion of FIG. 1 illustrating in detail the portion of the coupler which shows the coupler filter best.

The flow of gas in this direction acts in furtherance of the engagement of the first lip 109 of the coupler filter 106 against the first shoulder 103 of the coupler formed on the first wall means 101 of the coupler. Positioning of the coupler filter 106 at the inlet to the coupler enables any contaminants which may be in the gas stream to be filtered out of the gas stream prior to entering the coupler valve and its seating surfaces. FIG. 3 is an enlarged portion of the first end portion 16 of the coupler. It is this first end portion which houses the coupler filter. It will be observed that the coupler filter is very easily removed and replaced when dirty. The snap ring 104 holds the first lip 109 of the coupler filter 106 in engagement with the first shoulder 103 of the first wall means of the coupler. The snap ring 104 resides in recess 105 in the first wall means 101 of the coupler. It is therefore a simple matter to remove the snap ring 104 and retract the coupler filter for replacement or cleaning. The coupler filter is removed by hand or with a tool adapted to engage the interior of the nipple filter. The snap ring 104 in the preferred embodiment is constructed of metal. However, other materials such as plastic could be used for the snap ring. The description of the nipple follows.

The nipple 66 includes a nipple body 9, a check valve 11, a valve seat 78, a check valve guide 10, a check valve spring 62, a check valve guide clip 57, a second wall means 56, a second shoulder 123 located on the second wall means 56, an O-ring 126, a second recess 125 and a nipple filter 120. The nipple body 9 is generally cylindrically shaped and is adapted for insertion into the coupler 15. The nipple body has first 53 and second 54 end portions. The second end portion 54 is sometimes referred to herein as the second inlet. The second end portion of the nipple includes a face 55, conjugate to face 20 of the sliding sleeve 4.

Nipple body 9 includes an exterior surface 67. The exterior surface 67 of the nipple 9 has a circumferential locking notch 59. Circumferential locking notch 59 includes first 60, second 61 and third 80 walls. The nipple body 9 further includes second wall means 56 on the interior thereof defining a second fluid passageway 40'.

Check valve 11 includes a face 81 and an annular recess 64. Check valve spring 62 is disposed between check valve guide 10 and check valve 11 and urges check valve 11 into a closed position where it is in engagement with valve seat 78. This occurs when the nipple is not engaged with the coupler or while engaged when there is insufficient pressure on the face 81 of the check valve. Nipple member 9 has second wall means 56 therethrough. O-ring seal 63 resides in annular recess 64. O-ring seal 63 seals against valve seat 78 insuring that no flow of gas or fluid will leak to the environment from a receiver of the gas when the nipple is not engaged with the coupler. The receiver (not shown) resides downstream of the nipple. The O-ring seals employed in the present invention are preferably elastomeric seals. However, those skilled in the art may substitute other seals without deviating from the intent of the subject invention.

The nipple includes a nipple filter 120. The nipple filter has a first end portion 121 and a second end portion 122. Interior second wall means 56 of nipple 9 includes a second shoulder 123 on said second wall means 56 and a second recess 125 in said second wall means 56. The nipple filter additionally has a second lip 124.

Figure 2:
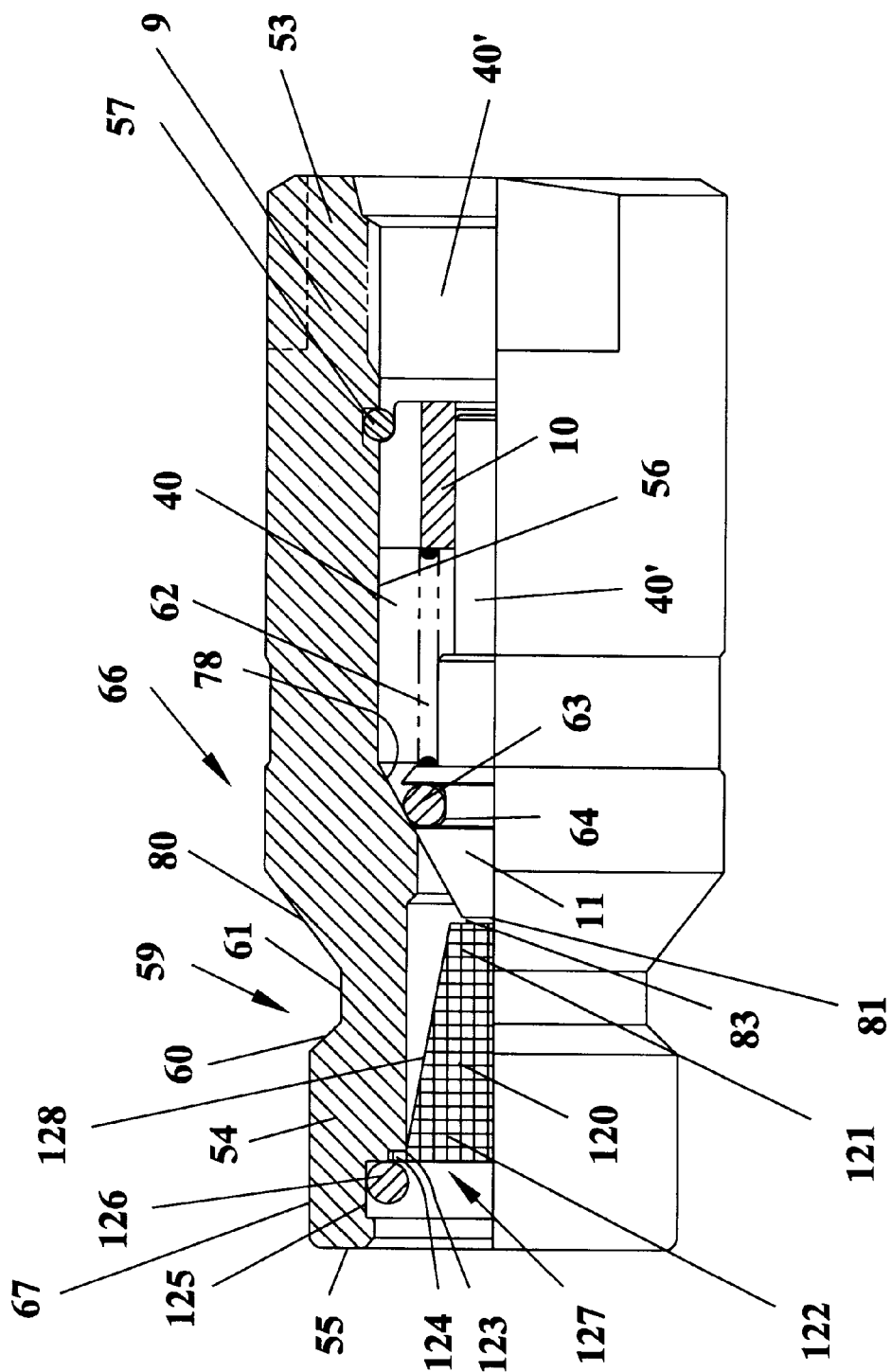
FIG. 2 is half-sectional view of the nipple disengaged.

The nipple filter 120 is generally conically shaped. However, it will be understood by those skilled in the art that the nipple filter 120 need not necessarily be conically shaped but could assume any one of a number of possible shapes. The nipple filter 120 is manufactured from the same materials as the coupler filter 106. The nipple further includes an O-ring for securing the nipple filter in place. It will be observed (FIGS. 2 and 4) that recess 125 is larger than O-ring 126 providing some space for movement of said O-ring 126. When the coupler and nipple are engaged the second end portion 41 of the coupler valve 12 urges O-ring 126 against nipple filter 120. O-ring 126 serves a dual purpose as a seal for the coupling when engaged and as a means for securing the nipple filter in place.

Figure 4:
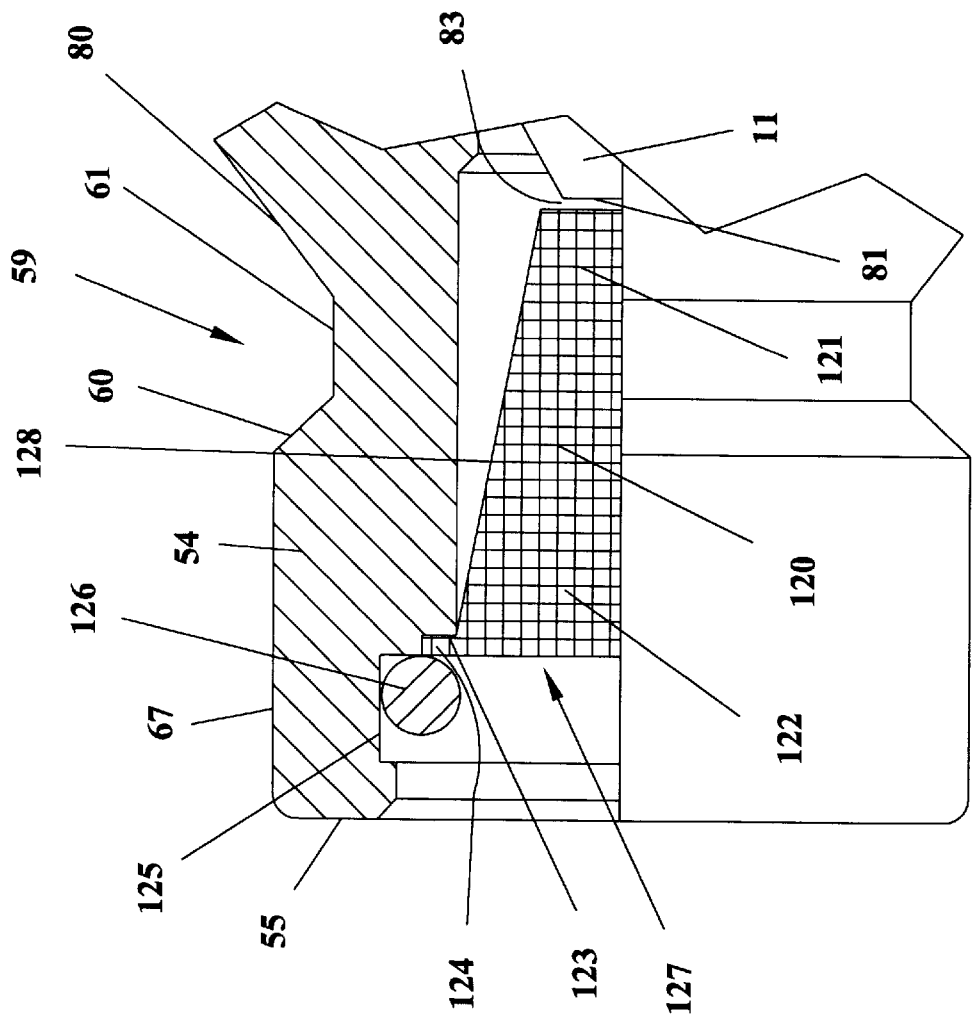
FIG. 4 is simply an enlarged half-sectional view of the nipple member showing the portion of the nipple member which has the nipple filter located therein.

FIG. 4 is an enlarged portion of the second end portion 54 of the nipple. The second end portion 122 of the nipple filter does not engage the face 81 of the check valve. There is a gap 83 between the face 81 of the check valve and the nipple filter 120. The second lip 124 of the nipple filter engages the second shoulder 123 of the second wall means 56 of the nipple body. The O-ring 126 is used to secure the nipple filter 120 in place. The O-ring is an elastomeric O-ring in the preferred embodiment.

The nipple filter is easily removed. The O-ring 126 is easily extracted from the second end portion 54 of the nipple 9. The nipple filter 120 is then simply removed by hand or with a tool adapted to engage the interior of the nipple filter. The nipple filter is oriented such that the flow is from the second end portion to the first end portion of the nipple, or put another way, from the left to the right when viewing FIG. 2. The nipple filter has an interior 127 and an exterior 128.

It should be understood that the present invention is such that it may be practiced by using or employing a filter in both the coupler and the nipple, the coupler only or the nipple only. The invention will work satisfactorily using any of the aforesaid combinations. It should also be understood that many different materials may be used for the coupler and nipple filters. It is further understood that many different configurations of the coupler and the nipple filter may be used.

It will be thus seen that a coupling for accomplishing the objectives of the invention has been provided. The objectives are to permit the clean transportation of a fluid medium such as a gas. This coupling includes a coupler female part and a nipple male part movable between coupled and uncoupled positions. The first and second walls define fluid passages through the coupler and the nipple. The coupler has first ball detents 6 which act between the coupler and the circumferential notch 59 of the nipple to hold the same together when the parts are in a coupled position.

When the adaptor 1 is connected to a pressure source a force is exerted on the coupler filter tending to secure the first lip of the coupler filter against the first shoulder 103 of the coupler. Additionally this pressure also exerts a force on the nipple filter securing the nipple filter against the second shoulder 123 of the nipple body formed on the wall means 56 of the nipple.

The retainer 3 is provided as part of the coupler and it is movable back and forth between locked and unlocked positions. The retainer functions to urge the ball type detents to firmly lock in position to prevent separation of the coupler and nipple. As seen, the so-called first ball detents 6 are carried in the openings 35 of the coupler and the circumferential locking notch 59 is provided in the nipple which receives one portion 95 of the first ball detents 6. The locking sleeve 5 is movable axially and surrounds the second portions 96 of the first ball detents.

The sliding sleeve 4 is axially movable and is positioned between the retainer and the nipple in the coupled condition of the coupling (not shown). The second ball detents 7 are carried in the coupler and have first 98 and second portions 99.

The sliding sleeve 4 in a first position engages the first portion 98 of the second ball detents to hold the second portions 99 of the second ball detents in engagement with the locking sleeve 5 to hold the locking sleeve 5 in a first position. See, FIG. 1 illustrating the coupler not engaged with the nipple.

The sliding sleeve in its second position (coupler and nipple engaged) permits radial inward movement of the second balls 7 which in turn permits movement of the locking sleeve to its second position (not shown). Movement of the retainer to the locked position (not shown) causes the retainer to engage the sliding sleeve which exerts a locking force on the first ball detents to hold them into engagement with the locking sleeve 5' and the circumferential notch 59 of the nipple to hold the coupler and nipple firmly and reliably together.

The coupler valve 12 and the check valve 11 are provided respectively in the coupler and the nipple and each are movable between an open and a closed position. The coupler valve spring 13 and check valve spring 62 are provided which normally urge the coupler valve 12 and the check valve 11 to the closed positions. See FIGS. 1 and 2. The coupler valve 12 in the coupler is opened by engagement with the nipple when the parts are coupled. The fluid pressure in the coupling when engaged causes the check valve member 11 in the nipple to move to the open position (not shown). The protective bumper 8 surrounds the coupler and particularly the locking sleeve 5 and the supporting block 5' with which it is connected and with which it moves axially. The bumper member 8 is preferably made of a synthetic resinous material. The bumper protects the end of the coupler.

While the invention has been described in combination with embodiments thereof, it is evident that many alternatives, modifications and variations will be apparent to those skilled in the art in light of the foregoing description. Accordingly, it is intended to embrace all of such alternatives, modifications and variations that fall within the spirit and the scope of the appended claims.

What is claimed is:

1. A coupling comprising a coupler and a nipple, said coupler includes a first wall means, said first wall means includes a first shoulder and a first recess, said coupler further includes a coupler filter and a snap-ring, said snap ring residing in said first recess, said coupler filter engaging said first shoulder and said snap-ring.

2. A coupling as claimed in claim 1 wherein said coupler filter is generally conically shaped.

3. A coupling as claimed in claim 2 wherein said coupler filter has pores in the range of 40 to 250 microns.

4. A coupling comprising a coupler and a nipple, said nipple includes a second wall means, said second wall means includes a second shoulder and a second recess, said nipple further includes a nipple filter and an O-ring, said O-ring resides in said second recess, said nipple filter engaging said second shoulder and said O-ring.

5. A coupling as claimed in claim 4 wherein said nipple filter is generally conically shaped.

6. A coupling as claimed in claim 5 wherein said nipple filter has pores in the range of 40 to 250 microns.

7. A coupling comprising a coupler and a nipple, a first wall means defining a first fluid passage through said coupler, a second wall means defining a second fluid passage through said nipple, said first wall means includes a first shoulder and a first recess, a snap-ring, a coupler filter, said coupler filter includes a first end portion and a second end portion, said first end portion of said coupler filter includes a first lip, said first lip of said coupler filter engages said first shoulder of said first wall means, said snap ring engages said coupler filter retaining said coupler filter in position, said second wall means includes a second shoulder and a second recess, an O-ring, a nipple filter, said nipple filter includes a first end portion and a second end portion, said second end portion of said nipple filter includes a second lip, said second lip of said nipple filter engages said second shoulder of said second wall means, and, said O-ring retains said nipple filter in position.

8. A coupling as claimed in claim 7 wherein said coupler includes a coupler valve, said coupler valve includes a first end portion and a second end portion, said second end portion engages and urges said O-ring in said nipple against said second lip of said nipple filter.

9. A coupling as claimed in claim 8 wherein said coupler filter is a stainless steel filter.

10. A coupling as claimed in claim 8 wherein said nipple filter is a stainless steel filter.

11. A coupling as claimed in claim 9 wherein said coupler filter has pores in the range of 40 to 250 microns.

12. A coupling as claimed in claim 10 wherein said nipple filter has pores in the range of 40 to 250 microns.

13. A coupler comprising a first wall means defining a first fluid passage through said coupler, said first wall means includes a first shoulder and a first recess, a snap-ring, a coupler filter, said coupler filter includes a first end portion and a second end portion, said first end portion of said coupler filter includes a first lip, said first lip of said coupler filter engages said first shoulder of said first wall means, said snap ring engages said first lip of said coupler filter retaining said coupler filter in position.

14. A nipple comprising a second wall means defining a second fluid passage through said nipple, said second wall means includes a second shoulder and a second recess, an O-ring, a nipple filter, said nipple filter includes a first end portion and a second end portion, said second end portion of said nipple filter includes a second lip, said second lip of said nipple filter engages said second shoulder of said second wall means, and, said O-ring retains said second lip of said nipple filter in position.

15. A coupling as claimed in claim 8 further including means for pressure locking said coupler and nipple together.

16. A coupler as claimed in claim 13 wherein said first fluid passage includes a first inlet, said coupler filter residing in said first inlet of said first fluid passage.

17. A nipple as claimed in claim 14 wherein said second fluid passage includes a second inlet, said nipple filter residing in said second inlet of said second fluid passage.

* * * * *